United States Patent
Raghuvaran et al.

(10) Patent No.: US 12,044,169 B2
(45) Date of Patent: Jul. 23, 2024

(54) SUMP ARRANGEMENT FOR A GAS TURBINE ENGINE

(71) Applicant: General Electric Company, Schenectady, NY (US)

(72) Inventors: Vaishnav Raghuvaran, Bengaluru (IN); Atanu Saha, Bengaluru (IN); Rajesh Kumar, Bengaluru (IN); Scott Alan Schimmels, Miamisburg, OH (US)

(73) Assignee: General Electric Company, Cincinnati, OH (US)

( * ) Notice: Subject to any disclaimer, the term of this patent is extended or adjusted under 35 U.S.C. 154(b) by 0 days.

(21) Appl. No.: 17/871,146

(22) Filed: Jul. 22, 2022

(65) Prior Publication Data

US 2024/0026820 A1    Jan. 25, 2024

(51) Int. Cl.
*F02C 7/06*    (2006.01)
*F02C 9/18*    (2006.01)
*F16N 7/30*    (2006.01)

(52) U.S. Cl.
CPC .............. *F02C 7/06* (2013.01); *F02C 9/18* (2013.01); *F16N 7/30* (2013.01); *F05D 2260/606* (2013.01); *F05D 2260/98* (2013.01); *F16N 2210/02* (2013.01)

(58) Field of Classification Search
CPC .......... F01D 5/081; F01D 5/082; F01D 5/084; F01D 5/085; F01D 5/087; F01D 9/065; F01D 25/183; F01D 11/02; F01D 11/001; F01D 11/005; F01D 11/06; F01D 11/08; F01D 11/008; F02C 7/06; F02C 7/28; F02C 9/18; F02C 6/08; F05D 2260/606; F05D 2220/323; F05D 2260/98; F04D 29/545; F02K 3/075; F16N 7/30; F16N 2210/02

See application file for complete search history.

(56) References Cited

U.S. PATENT DOCUMENTS

| | | | |
|---|---|---|---|
| 3,027,971 | A | 4/1962 | Ketler, Jr. |
| 3,133,693 | A | 5/1964 | Holl |
| 3,844,110 | A | 10/1974 | Widlansky et al. |
| 8,511,096 | B1 | 8/2013 | Haugen et al. |
| 9,540,951 | B2 | 1/2017 | Dos Santos et al. |
| 10,794,402 | B2 | 10/2020 | Venkata Mittapalli et al. |
| 11,073,091 | B2 | 7/2021 | Johnson et al. |
| 11,174,786 | B2 | 11/2021 | Mook et al. |
| 2014/0205447 | A1* | 7/2014 | Patat .................... F01D 25/125 415/111 |
| 2015/0275690 | A1* | 10/2015 | McCaffrey ............... F01D 1/02 416/1 |
| 2018/0252317 | A1* | 9/2018 | Prenger ................. F04D 29/164 |
| 2019/0063324 | A1 | 2/2019 | Gould et al. |
| 2020/0271055 | A1* | 8/2020 | Kempers ................ F01D 25/20 |

* cited by examiner

*Primary Examiner* — Todd E Manahan
*Assistant Examiner* — Rodolphe Andre Chabreyrie
(74) *Attorney, Agent, or Firm* — Dority & Manning, P.A.

(57) ABSTRACT

A gas turbine engine including a compressor section including a compressor and a turbine section located downstream of the compressor section. The turbine section including a high pressure turbine, a low pressure turbine, a sump positioned between the high pressure turbine and the low pressure turbine, and a rotating cross flow arrangement defining a plurality of guiding passages fluidly coupling the compressor to the sump.

19 Claims, 6 Drawing Sheets

SUMP ARRANGEMENT FOR A GAS TURBINE ENGINE

FIELD

The present disclosure relates to a rotating cross flow arrangement for a gas turbine engine and a method for operating the same.

BACKGROUND

A gas turbine engine generally includes a fan and a turbomachine arranged in flow communication with one another. Additionally, the turbomachine of the gas turbine engine includes, in serial flow order, a compressor section, a combustion section, a turbine section, and an exhaust section. In operation, air is provided from the fan to an inlet of the compressor section where one or more axial compressors progressively compress the air until it reaches the combustion section to provide combustion gases. The combustion gases are routed from the combustion section to the turbine section. The flow of combustion gasses through the turbine section drives the turbine section and is then routed through the exhaust section, e.g., to the atmosphere. Additionally, the gas turbine engine generally includes at least one bearing assembly surrounded by a sump that supports a rotatable shaft.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The term "gas turbine engine" refers to an engine having a turbomachine as all or a portion of its power source. Example gas turbine engines include turbofan engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "low" and "high", or their respective comparative degrees (e.g., -er, where applicable), when used with a compressor, a turbine, a shaft, or spool components, etc. each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" of the engine.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The term "coupled" and the like refers to both direct coupling, fixing, or attaching, as well as indirect coupling, fixing, or attaching through one or more intermediate components or features, unless otherwise specified herein.

As used herein, the terms "integral", "unitary", or "monolithic" as used to describe a structure refers to the structure being formed integrally of a continuous material or group of materials with no seams, connections joints, or the like. The integral, unitary structures described herein may be formed through additive manufacturing to have the described structure, or alternatively through a casting process, etc.

As will be appreciated, the use of the high pressure and high temperature bleed air to pressurize a sump can result in a reduction in an efficiency of an engine, as a lot of energy goes into pressurizing the air flow through the compressor section extracted as bleed air, and further, a lot of energy must be used to cool such bleed air. Improvements to the gas turbine engine to utilize a lower pressure and lower temperature bleed air to pressurize the sump would be welcomed in the art.

In particular, the present disclosure is generally related to a rotating cross flow arrangement of a gas turbine engine defining a plurality of guiding passages fluidly coupling a compressor of the gas turbine engine to a sump of a turbine section of the gas turbine engine. During an operating condition of the gas turbine engine, the rotating cross flow arrangement may be configured to cross a compressed air flow and a purge air flow. The compressed air flow may be used to pressurize the sump. The implementation of the rotating cross flow arrangement may allow for the compressed air flow to be bleed air from a low pressure and low temperature source such as a low pressure center vent flow.

More specifically, in one exemplary aspect, a gas turbine engine is provided. The gas turbine engine includes a compressor section including a compressor and a turbine section located downstream of the compressor section. The turbine section includes a high pressure turbine, a low pressure turbine, a sump, and a rotating cross flow arrangement. The sump is positioned between the high pressure turbine and the low pressure turbine in such a manner that the sump supports the high pressure turbine. More specifically, the sump encloses one or more bearings that support rotation of the high pressure turbine.

Aspects of the present disclosure further present a method of operating a gas turbine engine. The method includes providing a compressed air flow of the compressor section to the sump during an operating condition of the gas turbine engine. The method further includes crossing the compressed air flow with a purge air flow of the high pressure turbine within a rotating cross flow arrangement at a location within the turbine section. For example, the rotating cross flow arrangement may be formed integrally with a torque cone of the low pressure turbine.

The gas turbine engine and the method of operating the gas turbine engine of the present disclosure may augment previously employed gas turbine engines. As will be discussed in more detail below, the rotating cross flow arrangement may advantageously be configured to pressurize the sump with a low pressure and low temperature compressed air. Benefits of the disclosed method include increased efficiency of the gas turbine engine and increased longevity of components of the gas turbine engine. In particular, the gas turbine engine and the method of operating the gas turbine engine of the present disclosure may utilize a low pressure and low temperature air flow from a low pressure compressor to provide an air flow to pressurize a sump within a turbine section, reducing an amount of high pressure cooled cooling air (i.e., air bled from a high pressure compressor and cooled using a heat exchanger) needed by the sump, and therefore increasing an overall efficiency of the gas turbine engine.

Figure 1:
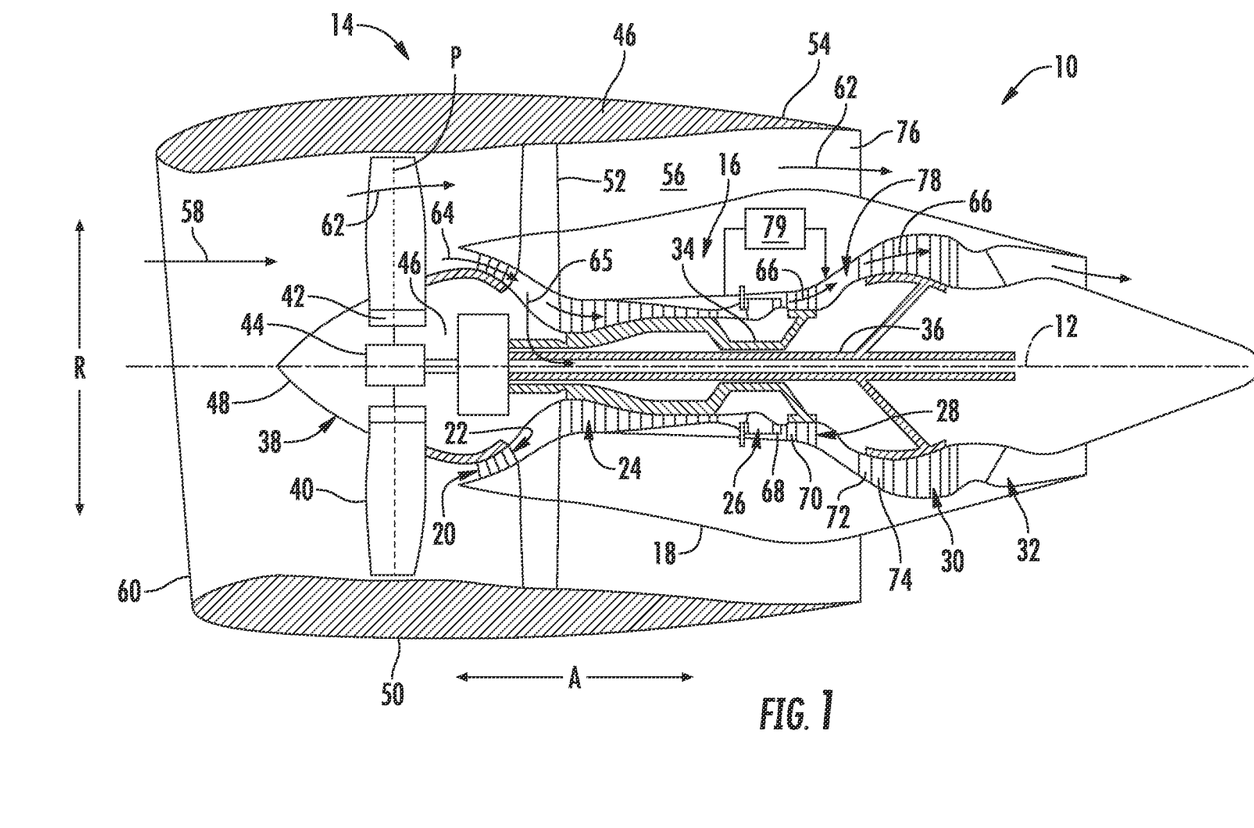
FIG. 1 is a schematic cross-sectional view of a gas turbine engine in accordance with an exemplary aspect of the present disclosure.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan engine 10, referred to herein as "turbofan engine 10." As shown in FIG. 1, the turbofan engine 10 defines an axial direction A (extending parallel to a longitudinal centerline 12 provided for reference), a radial direction R, and a circumferential direction (i.e., a direction extending about the axial direction A; not depicted). In general, the turbofan engine 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a compressor or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front nacelle 48 aerodynamically contoured to promote an air flow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that the nacelle 50 may be configured to be supported relative to the core turbine engine 16 by a plurality of circumferentially-spaced outlet guide vanes 52. Moreover, a downstream section 54 of the nacelle 50 may extend over an outer portion of the core turbine engine 16 so as to define a bypass air flow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass air flow passage 56 and a second portion of the air 58 as indicated by arrow 64 is directed or routed into the LP compressor 22. As the second portion of air 64 is directed or routed into the LP compressor 22, a bleed portion of air 64 indicated by arrow 65 is directed or routed into the LP shaft 36. The bleed portion of air 65 referred to herein as "compressed air flow 65" refers to compressed air taken from the compressor section upstream of the turbine section, and more specifically for the exemplary aspect depicted, refers to compressed air taken from upstream of the HP compressor 24. For example, the compressed air flow may be a low pressure center vent flow.

More particularly, the ratio between the first portion of air 62 and the second portion of air 64 is a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass air flow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the core turbine engine 16.

Moreover, as is depicted schematically, the exemplary turbofan engine 10 further includes various accessory systems to aid in the operation of the turbofan engine 10 or an aircraft including the turbofan engine 10. For example, the exemplary turbofan engine 10 further includes a main lubrication system configured to provide a lubricant to, e.g., various bearings and gear meshes in the compressor section (including the LP compressor 22 and HP compressor 24), the turbine section (including the HP turbine 28 and the LP turbine 30), the HP spool 34, the LP spool 36, and the power gear box 46. The lubricant provided by the main lubrication system may increase the useful life of such components and may remove a certain amount of heat from such components. Additionally, the turbofan engine 10 includes a compressor cooling air (CCA) system 79 for providing air from one or both of the HP compressor 24 or LP compressor 22 to one or both of the HP turbine 28 or LP turbine 30.

It should be appreciated, however, that the exemplary turbofan engine 10 depicted in FIG. 1 is by way of example only, and that in other exemplary embodiments, the turbofan engine 10 may have any other suitable configuration.

Figure 2:
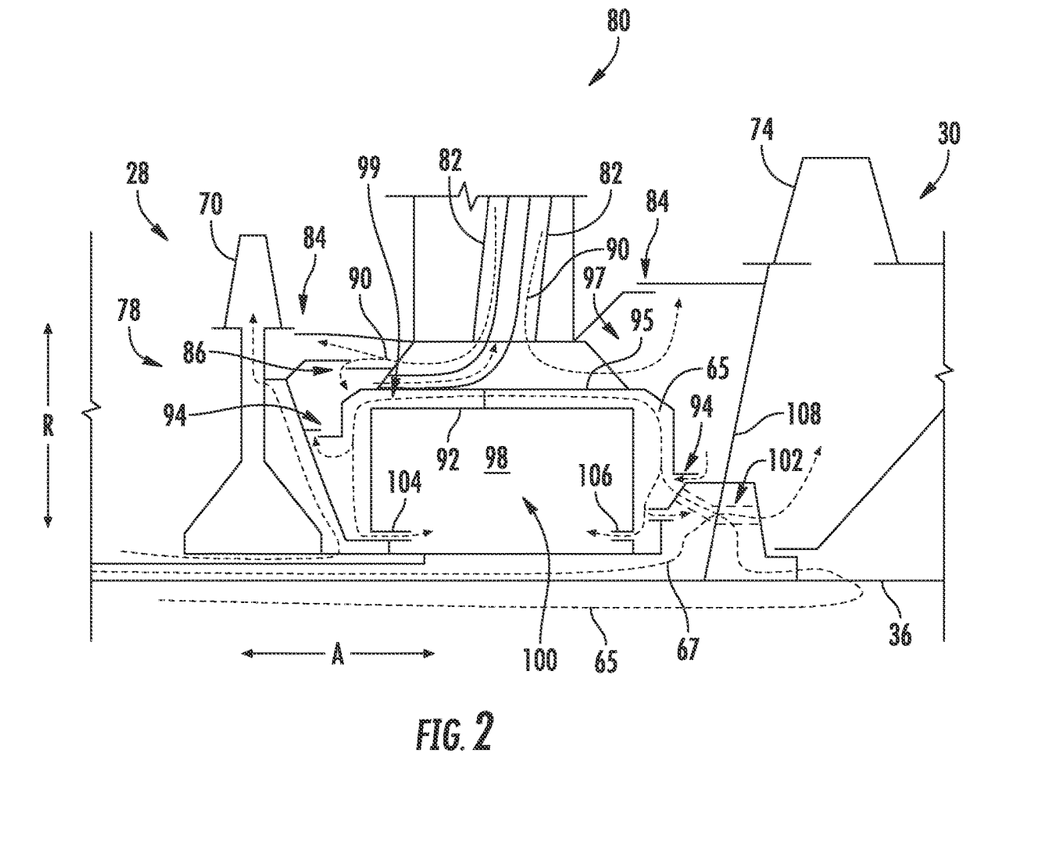
FIG. 2 is a schematic cross-sectional view of a turbine section in accordance with an exemplary aspect of the present disclosure.

Referring now to FIG. 2, a schematic cross-sectional view of a turbine section 80 of a gas turbine engine in accordance with an exemplary aspect of the present disclosure is provided. It should be appreciated that the exemplary turbine section 80 may substantially be configured in the same or similar manner as the turbine section of FIG. 1. Thus, same or similar reference numbers may be used to describe same or similar parts.

The turbine section 80 of the exemplary embodiment defines an axial direction A and a radial direction R. Further, the turbine section 80 includes a high pressure (HP) turbine 28, a low pressure (LP) turbine 30, a sump 100, a rotating cross flow arrangement 102, a plurality of cooling air guiding passages 82, a first plurality of flow path seals 84, and a secondary flow path seal 86. More particularly, the sump 100 includes an outer casing 95 an inner casing 92, a plurality of secondary sump seals 94, a forward seal 104, and an aft seal 106. An outer flow path 97 is defined between the outer casing 95 of the sump 100 and the first plurality of flow path seals 84. The first plurality of flow path seals 84 are generally positioned to be directly exposed to, and provide a seal with, a working gas flow path of the turbine section 80. Further, an inner flow path 99 is defined between the outer casing 95 and the inner casing 92 of the sump 100. The plurality of secondary sump seals 94 are positioned between, and provide for an air flow seal between, the outer flow path 97 and the inner flow path 99.

The plurality of cooling air guiding passages 82 provide a flow of cooled and pressurized air 90 to the outer flow path 97 surrounding the outer casing 95 of the sump 100.

The plurality of secondary flow path seals 86 that are configured to inhibit mixing of the cooled and pressurized air 90 with a compressed air flow 65 (described in more detail below). It should be appreciated that the flow path is in thermal communication with the sump 100, and more specifically, the flow path is in thermal communication with the portion of the outer casing 95 of the sump 100.

More particularly, the sump 100 is positioned between the HP turbine 28 and the LP turbine 30 in such a manner that the sump 100 supports the HP turbine 28. It will be appreciated that the turbine section includes one or more bearings (not depicted for clarity) that support rotation of the HP turbine 28. The one or more bearings are enclosed within the sump 100, and more specifically, the one or more bearings are enclosed within the inner casing 92 of the sump 100. The sump 100 collects lubrication fluid that is provided through a lubrication oil supply system (not depicted for clarity) to the one or more bearings enclosed within the sump 100 (not depicted in FIG. 2).

Generally, the operation of the one or more bearings enclosed within the sump 100 may produce a significant amount of heat. To cool the sump 100, and more specifically, the one or more bearings to an operational temperature, the cooled and pressurized air 90 is introduced in the flow path. The cooled and pressurized air 90 is in flow communication with the compressor section, and more specifically still, the cooled and pressurized air 90 is in flow communication with the HP compressor 24. In such a manner, the cooled and pressurized air 90 may be referred to as a bleed air flow from the HP compressor 24. The cooled and pressurized air 90 travels from the HP compressor 24, to a dedicated heat exchanger (not depicted for clarity) where the cooled and pressurized air 90 is cooled by the dedicated heat exchanger, and to flow path through the plurality of cooled air guiding passages 82. Moreover, it should be appreciated that the cooled and pressurized air 90 may be a part of a cooling air system, such as CCA system 79 described in FIG. 1.

To minimize loss of the lubrication fluid, the forward seal 104 and the aft seal 106 are utilized. The forward seal 104 and the aft seal 106 may be labyrinth seals. To inhibit leakage of the sump 100, the compressed air flow 65 is introduced into and around the sump 100 to pressurize the sump 100, e.g., pressurize the forward seal 104 and the aft seal 106. It should be appreciated that "around the sump 100" refers to the area between the outer casing 95 of the sump 100 and the inner casing 92 of the sump 100. More particularly, the compressed air flow 65 is in flow communication with the compressor section, and more specifically still, the compressed air flow 65 is in flow communication with the LP compressor 22. In such a manner, the compressed air flow 65 may be referred to as a bleed air flow from the LP compressor 22. The compressed air flow 65 travels from the LP compressor 22, through the LP shaft 36, and to the rotating cross flow arrangement 102, described in more detail below.

As will be appreciated, in the embodiment of FIG. 2, the 90 provided to the outer flow path 97 may need to be at a relatively high pressure to ensure air flow through the working gas flow path does not traverse the 84 during operation. However, in at least certain embodiments, an internal cavity 98 of the sump 100 may be maintained at a lower pressure. As such, the inner flow path surrounding the sump 100 (opposite the internal cavity 98 of the sump 100 from the seals 104, 106) may not need to be as highly pressurized as the outer flow path 97. In such a manner, the compressed air flow 65 from the LP compressor 22 may be provided to pressurize the sump 100, while 90 from the HP compressor 24 may be provided to pressurize the outer flow path 97 defined in part by the 84. Such a configuration may result in a more efficient pressurization system by using a lower pressure air (which takes less energy to generate) to pressurize lower pressure areas surrounding the sump 100.

Referring still to FIG. 2, in the exemplary embodiment depicted, the rotating cross flow arrangement 102 is configured to cross the compressed air flow 65 with a purge air flow 67. The purge air flow 67 is a forward bore cooling flow. More particularly the purge air flow is in flow communication with the compressor section. It should be appreciated that the rotating cross flow arrangement 102 may be configured to fluidly couple various components of the gas turbine engine. In particular, for the embodiment depicted, the rotating cross flow arrangement 102 is configured provide a cross flow operation of the compressed air flow 65 and the purge air flow 67 (i.e., provide the compressed air flow 65 from a first side of the rotating cross flow arrangement 102 to a second side of the rotating cross flow arrangement 102, and provide the purge air flow 67 from the second side of the rotating cross flow arrangement 102 to the first side of the rotating cross flow arrangement 102). More specifically, for the exemplary embodiment depicted, the rotating cross flow arrangement 102 is configured to provide the cross flow operation of the compressed air flow 65 and the purge air flow 67 and separately seal the compressed air flow 65 and the purge air flow 67 in such a manner that mixing of the compressed air flow 65 and the purge air flow 67 does not occur during the cross flow operation.

In particular, for the embodiment depicted, the rotating cross flow arrangement 102 is rotatable with the LP turbine 30. More specifically, the LP turbine includes a torque cone 108 extending between the plurality of LP turbine rotor blades 74 and the LP shaft 36, such that the torque cone 108 couples the LP shaft 36 with the LP turbine rotor blades 74. The rotating cross flow arrangement 102 is attached to or formed integrally with the torque cone 108 of the LP turbine 30.

It should be appreciated that the rotating cross flow arrangement 102 may be positioned in any suitable arrangement to fluidly couple the compressor to the sump 100. For example, the rotating cross flow arrangement 102 may be coupled to the torque cone 108 or may be configured in any other suitable arrangement.

Figure 3:
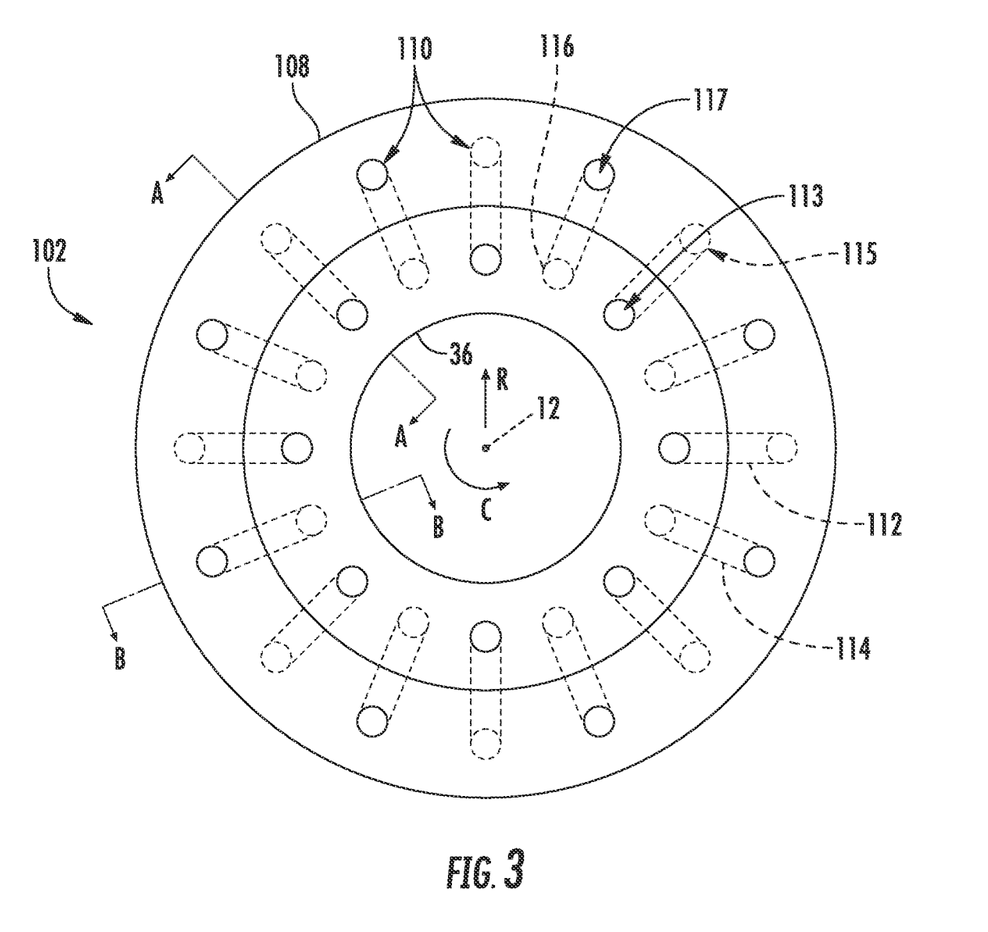
FIG. 3 is an aft-facing-forward view of a rotating cross flow arrangement in accordance with an exemplary aspect of the present disclosure.

Now referring to FIG. 3, a schematic, aft looking forward view of the rotating cross flow arrangement 102 in accordance with the exemplary aspect of FIG. 2 is provided. In particular, the view of FIG. 3 depicts schematically the LP shaft 36 and the torque cone 108. The rotating cross flow arrangement 102 defines the plurality of guiding passages 110. The plurality of guiding passages 110 further includes a plurality of compressed air flow guiding passages 112 and a plurality of purge air flow guiding passages 114.

More particularly, the plurality of compressed air flow guiding passages 112 are configured to receive the compressed air flow 65 through an associated compressed air flow inlet 113. Subsequently the compressed air flow 65 is routed through the plurality of compressed air flow guiding passages 112 where it exits through an associated compressed air flow outlet 115. Additionally, the plurality of purge air flow guiding passages 114 are configured to receive the purge air flow 67 through an associated purge air flow inlet 116. Subsequently the purge air flow 67 is routed through the plurality of purge air flow guiding passages 67 where it exits through an associated purge air flow outlet 117.

Figure 4:
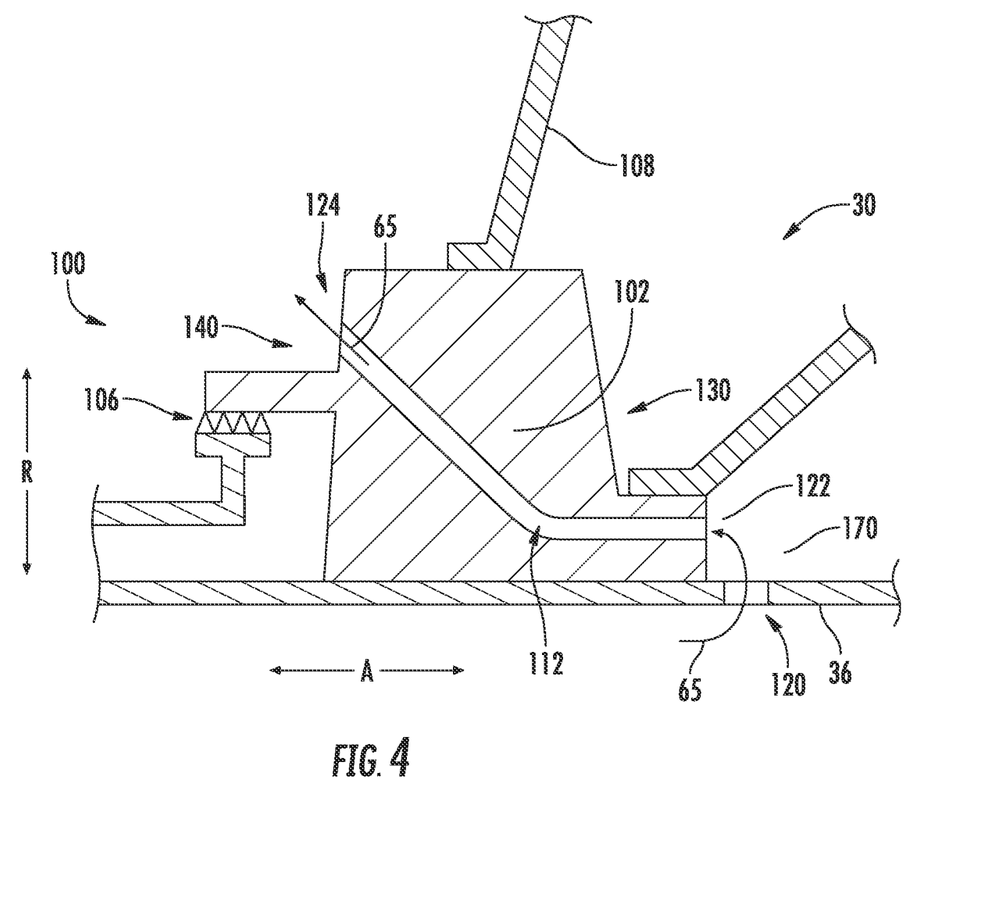
FIG. 4 is a schematic cross-sectional view of the rotating cross flow arrangement in FIG. 3 taken along line A-A.
Figure 5:
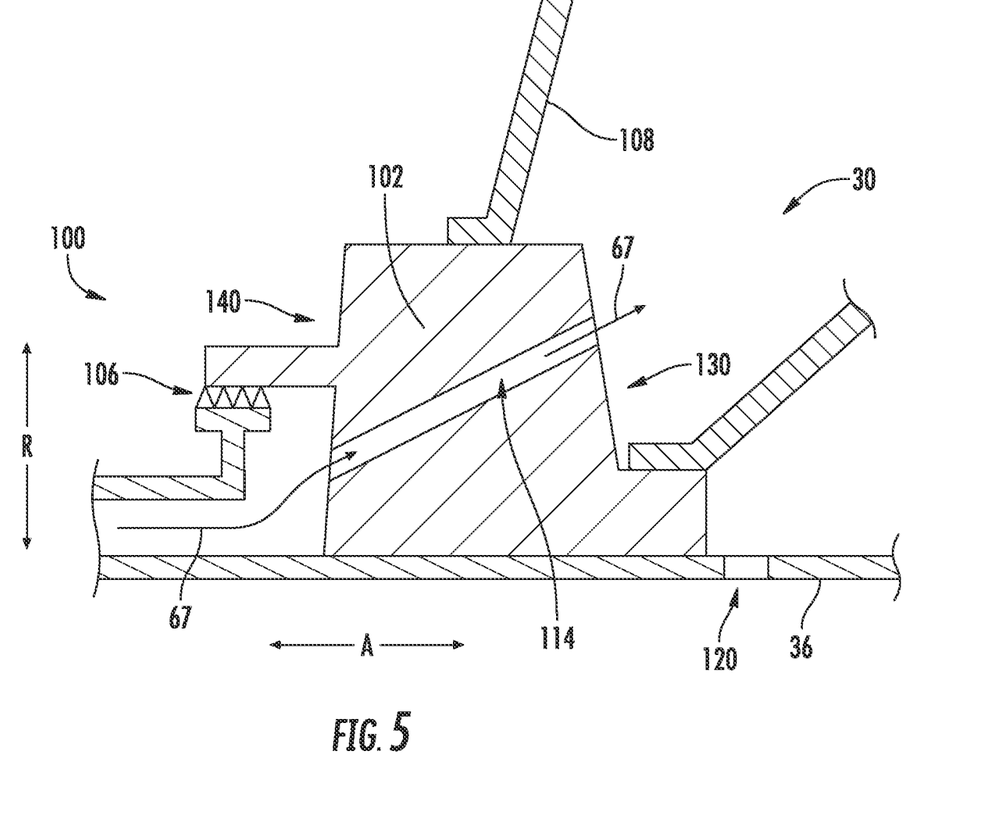
FIG. 5 is a schematic cross-sectional view of the rotating cross flow arrangement in FIG. 3 taken along line B-B.

Now referring to FIGS. 4 and 5, schematic cross-sectional views of the rotating cross flow arrangement 102 of the turbine section in accordance with aspects of the present disclosure are provided. The rotating cross flow arrangement 102 of FIGS. 4 and 5, is attached to or formed integrally with the torque cone 108 of the LP turbine 30. The rotating cross flow arrangement 102 is configured to cross the compressed air flow 65 with the purge air flow 67 during a cross flow operation. Further, the rotating cross flow arrangement 102 separately seals the compressed air flow 65 from the purge air flow 67 during the cross flow operation.

Referring now specifically to FIG. 4, a close-up schematic cross sectional view of the rotating cross flow arrangement 102 taken along line A-A of FIG. 3 is provided. Depicted in the exemplary embodiment is the torque cone 108 and the rotating cross flow arrangement 102, the rotating cross flow arrangement 102 defining the compressed air flow guiding passage 112, and further defining an aft side 130 and a forward side 140.

The compressed air flow guiding passage 112 of the rotating cross flow arrangement 102 fluidly defines an opening 120 in the LP shaft 36 that is in flow communication with the rotating cross flow arrangement 102.

During operation of the gas turbine engine, the compressed air flow 65 is routed into the compressed air flow inlet 122 at the aft side 130 of the rotating cross flow arrangement 102 from the opening 120. The compressed air flow 65 is routed through the compressed air flow guiding passage 112 and exits the compressed air flow guiding passage 112 at the forward side 140 through the compressed air flow outlet 124 around the sump 100. The compressed air flow 65 then pressurizes the sump 100.

Referring now specifically to FIG. 5, a close-up schematic cross sectional view of the rotating cross flow arrangement 102 taken along line B-B of FIG. 3 is provided. Depicted in the exemplary embodiment is a cross-section of the torque cone 108 and the rotating cross flow arrangement 102, the rotating cross flow arrangement 102 defining the purge air flow guiding passage 114. The purge air flow guiding passage 114 of the rotating cross flow arrangement 102 fluidly couples an inner cavity of the HP shaft 34 and the LP turbine 30, and more specifically a cavity defined at least in part the torque cone 108 in the embodiment shown.

During operation of the gas turbine engine, the purge air flow 67 is routed into purge air flow guiding passage 114 through the associated purge air flow inlet 116 at the forward side 140 of the rotating cross flow arrangement 102 from inner cavity of the HP shaft 34. The purge air flow 67 is routed through the purge air flow guiding passage 114 and exits the purge air flow guiding passage 114 at the aft side 130 of the rotating cross flow arrangement 102 through the associated purge air flow outlet 117.

Figure 6:
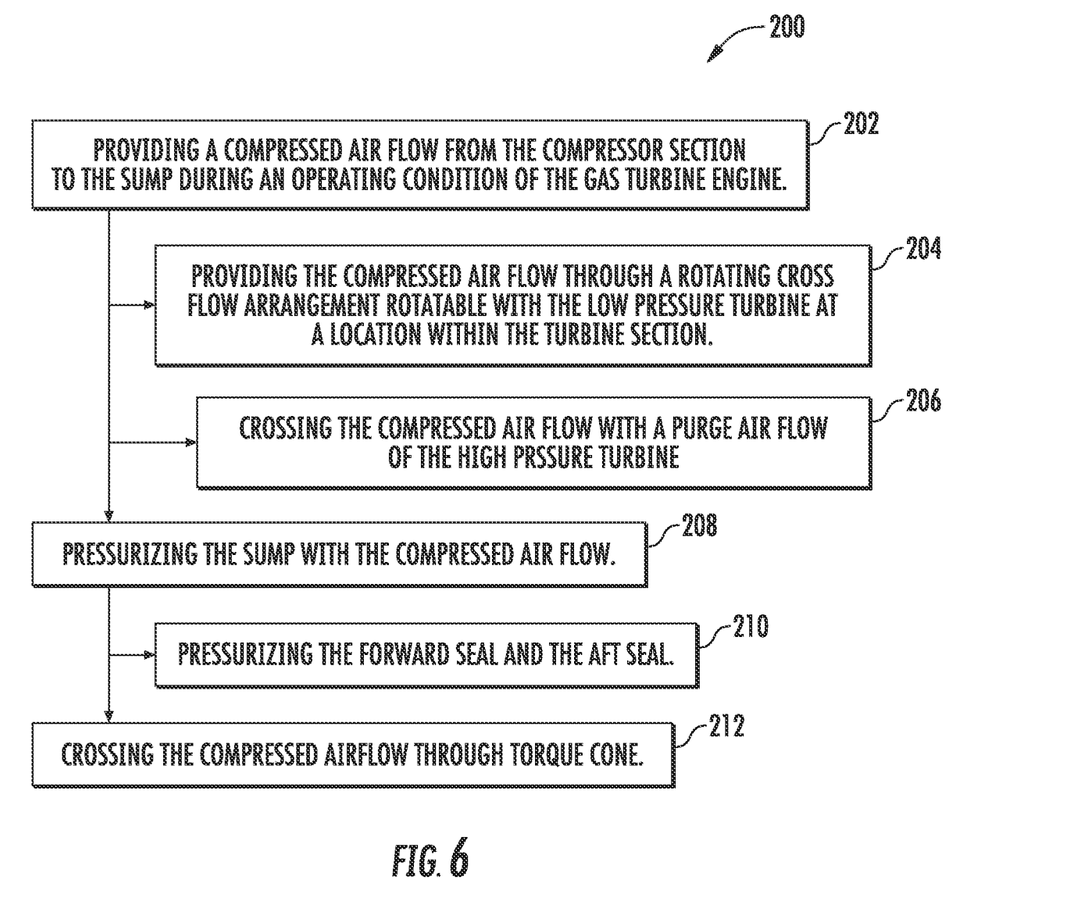
FIG. 6 is a flow diagram of a method of operating a gas turbine engine in accordance with an exemplary embodiment of the present disclosure.

Now referring to FIG. 6 a flow diagram of a method (200) of operating a gas turbine engine is provided. In at least certain exemplary embodiments, the method may be utilized to operate one or more of the exemplary rotating cross flow arrangements described above with reference to FIGS. 1 through 5. For example, the rotating cross flow arrangement may define a plurality of guiding passage and may be integrally formed with a torque cone of the low pressure turbine.

The method generally includes at (202) providing a compressed air flow from the compressor section to the sump during an operating condition of the gas turbine engine. More particularly, providing the compressed air flow from the compressor section to the sump during an operating condition of the gas turbine engine includes at (204) providing the compressed air flow through a rotating cross flow arrangement rotatable with the low pressure turbine at a location within the turbine section. Moreover, providing the compressed air flow through a rotating cross flow arrangement rotatable with the low pressure turbine at a location within the turbine section further includes at (206) crossing the compressed air flow with a purge air flow of the high pressure turbine.

Additionally, the method (200) includes at (208) pressurizing the sump with the compressed air flow. More particularly, pressurizing the sump with the compressed air flow includes at (210) pressurizing the forward seal and the aft seal. Further, the method (200) includes at (212) crossing the compressed air flow with the torque cone.

Further aspects are provided by the subject matter of the following clauses:

A gas turbine engine comprising: a compressor section comprising a compressor; and a turbine section located downstream of the compressor section, the turbine section comprising: a high pressure turbine; a low pressure turbine; a sump positioned between the high pressure turbine and the low pressure turbine, and a rotating cross flow arrangement defining a plurality of guiding passages fluidly coupling the compressor to the sump.

The gas turbine engine of any preceding clause, wherein the rotating cross flow arrangement crosses a compressed air flow with a purge air flow through the plurality of guiding passages.

The gas turbine engine of any preceding clause, wherein the plurality of guiding passages providing for the compressed air flow are in flow communication with the sump for pressurizing the sump.

The gas turbine engine of any preceding clause, wherein the plurality of guiding passages seals the compressed air flow from the purge air flow.

The gas turbine engine of any preceding clause, wherein the compressed air flow is a low pressure center vent flow.

The gas turbine engine of any preceding clause, wherein the plurality of guiding passages providing for the low pressure center vent flow are in flow communication with the compressor.

The gas turbine engine of any preceding clause, wherein the purge air flow is a forward bore cooling flow.

The gas turbine engine of any preceding clause, wherein the rotating cross flow arrangement is rotatable with the low pressure turbine.

The gas turbine engine of any preceding clause, wherein the low pressure turbine comprises a torque cone, and wherein the rotating cross flow arrangement is coupled to or formed integrally with the torque cone.

The gas turbine engine of any preceding clause, wherein the plurality of guiding passages provide an air flow path for a compressed air flow across the torque cone.

A method of operating a gas turbine engine, wherein the gas turbine engine comprises a compressor section and a turbine section, the turbine section comprising a high pressure turbine, a low pressure turbine, a sump, and a sump pressurization assembly, wherein the sump is positioned between the high pressure turbine and the low pressure turbine, the method comprising: providing a compressed air flow from the compressor section to the sump during an operating condition of the gas turbine engine, wherein providing the compressed air flow comprises providing the compressed air flow through a rotating cross flow arrangement rotatable with the low pressure turbine at a location within the turbine section.

The method of any preceding clause, wherein providing the compressed air flow through the rotating cross flow arrangement comprises crossing the compressed air flow with a purge air flow of the high pressure turbine.

The method of any preceding clause, wherein the purge air flow is a forward bore cooling flow.

The method of any preceding clause, wherein the method of operating the gas turbine engine further comprises: pressurizing the sump with the compressed air flow, wherein the sump comprises a forward seal and an aft seal, and wherein pressurizing the sump comprises pressurizing the forward seal and the aft seal.

The method of any preceding clause, wherein the rotating cross flow arrangement comprises a plurality of guiding passages, and wherein the plurality of guiding passages separately seals the compressed air flow and a purge air flow.

The method of any preceding clause, wherein the compressed air flow is a low pressure center vent flow.

The method of any preceding clause, wherein the low pressure center vent flow is in flow communication with the compressor section.

The method of any preceding clause, wherein the rotating cross flow arrangement is formed integrally with a torque cone of the low pressure turbine.

The method of any preceding clause, wherein the rotating cross flow arrangement is coupled to the torque cone of the low pressure turbine.

The method of any preceding clause, wherein the method of operating the gas turbine engine further comprises: crossing the compressed air flow through torque cone.

A gas turbine engine comprising: a sump; and a rotating cross flow arrangement defining a plurality of guiding passages fluidly configured to cross a first flow path and a second flow path.

The gas turbine engine of any preceding clause, wherein the plurality of guiding passages seals the first flow path from the second flow path.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed:

1. A gas turbine engine comprising:
   a compressor section comprising a compressor; and
   a turbine section located downstream of the compressor section, the turbine section comprising:
      a high pressure turbine;
      a low pressure turbine;
      a sump positioned between the high pressure turbine and the low pressure turbine, and
      a rotating cross flow arrangement defining a plurality of guiding passages fluidly coupling the compressor to the sump.

2. The gas turbine engine of claim 1, wherein the rotating cross flow arrangement crosses a compressed air flow with a purge air flow through the plurality of guiding passages.

3. The gas turbine engine of claim 2, wherein the plurality of guiding passages providing for the compressed air flow are in flow communication with the sump for pressurizing the sump.

4. The gas turbine engine of claim 2, wherein the plurality of guiding passages seals the compressed air flow from the purge air flow.

5. The gas turbine engine of claim 2, wherein the compressed air flow is a low pressure center vent flow.

6. The gas turbine engine of claim 5, wherein the plurality of guiding passages providing for the low pressure center vent flow are in flow communication with the compressor.

7. The gas turbine engine of claim 2, wherein the purge air flow is a forward bore cooling flow.

8. The gas turbine engine of claim 1, wherein the rotating cross flow arrangement is rotatable with the low pressure turbine.

9. The gas turbine engine of claim 8, wherein the low pressure turbine comprises a torque cone, and wherein the rotating cross flow arrangement is coupled to or formed integrally with the torque cone.

10. The gas turbine engine of claim 9, wherein the plurality of guiding passages provide an air flow path for a compressed air flow across the torque cone.

11. A method of operating a gas turbine engine, wherein the gas turbine engine comprises a compressor section and a turbine section, the turbine section comprising a high pressure turbine, a low pressure turbine, and a sump, the sump is positioned between the high pressure turbine and the low pressure turbine, the method comprising:

providing a compressed air flow from the compressor section to the sump during an operating condition of the gas turbine engine, wherein providing the compressed air flow comprises providing the compressed air flow through a rotating cross flow arrangement rotatable with the low pressure turbine at a location within the turbine section.

12. The method of claim 11, wherein providing the compressed air flow through the rotating cross flow arrangement comprises crossing the compressed air flow with a purge air flow of the high pressure turbine.

13. The method of claim 12, wherein the purge air flow is a forward bore cooling flow.

14. The method of claim 11, wherein the method of operating the gas turbine engine further comprises:

pressurizing the sump with the compressed air flow, wherein the sump comprises a forward seal and an aft seal, and wherein pressurizing the sump comprises pressurizing the forward seal and the aft seal.

15. The method of claim 11, wherein the rotating cross flow arrangement comprises a plurality of guiding passages, and wherein the plurality of guiding passages separately seals the compressed air flow and a purge air flow.

16. The method of claim 11, wherein the compressed air flow is a low pressure center vent flow.

17. The method of claim 11, wherein the rotating cross flow arrangement is formed integrally with a torque cone of the low pressure turbine.

18. A gas turbine engine comprising:

a sump;

a rotor being rotatable during operation of the gas turbine engine; and a rotating cross flow arrangement rotatable with the rotor and defining a plurality of guiding passages fluidly configured to cross a first flow path and a second flow path, wherein the first flow path is fluidly coupled to the sump.

19. The gas turbine engine of claim 18, wherein the plurality of guiding passages seals the first air flow from the second air flow path.

* * * * *